Dec. 9, 1930.  H. CHRÉTIEN  1,783,998
PHOTOGRAPHIC REPRODUCTION OBJECTIVE WITH TWO DIAPHRAGMS AND ITS
APPLICATION AS IN PRINTING POSITIVES FOR BLACK AND WHITE
CINEMATOGRAPHY, COLOR CINEMATOGRAPHY, OR
CINEMATOGRAPHY IN RELIEF
Filed Jan. 9, 1928   2 Sheets-Sheet 1
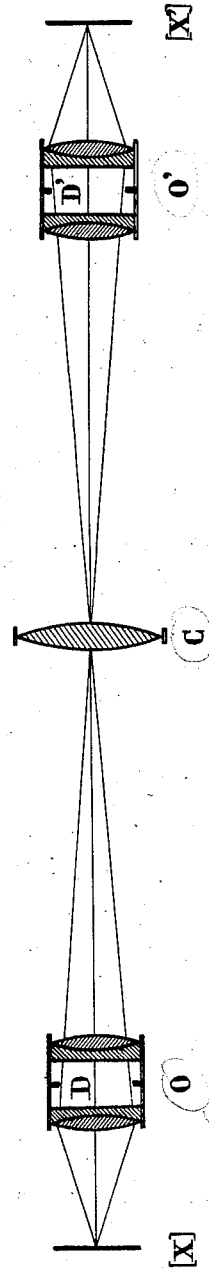
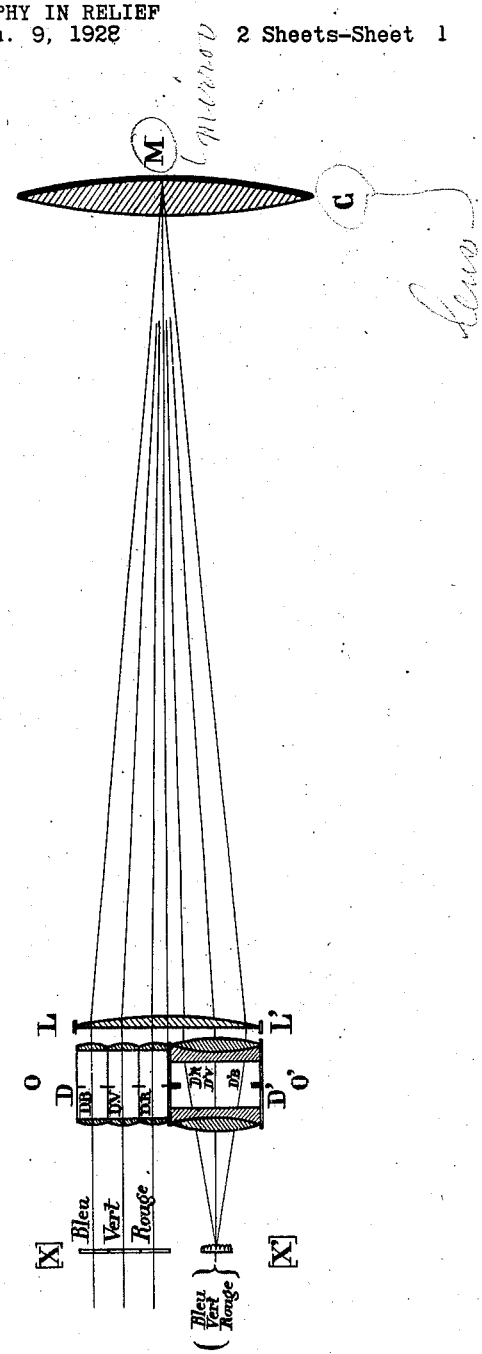

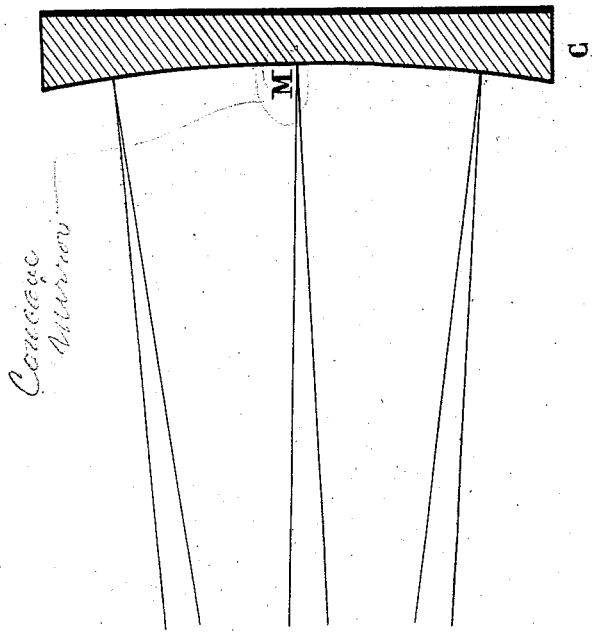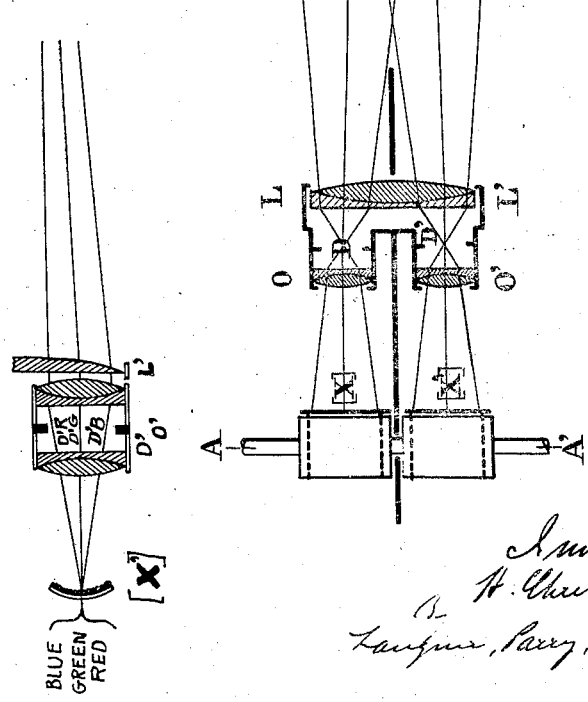

Patented Dec. 9, 1930

1,783,998

UNITED STATES PATENT OFFICE

HENRI CHRÉTIEN, OF ST.-CLOUD, FRANCE, ASSIGNOR TO SOCIETE ANONYME FRANCAISE DITE: SOCIETE TECHNIQUE D'OPTIQUE ET DE PHOTOGRAPHIE (S. T. O. P.), OF ST.-OUEN, FRANCE

PHOTOGRAPHIC REPRODUCTION OBJECTIVE WITH TWO DIAPHRAGMS AND ITS APPLICATION AS IN PRINTING POSITIVES FOR BLACK AND WHITE CINEMATOGRAPHY, COLOR CINEMATOGRAPHY, OR CINEMATOGRAPHY IN RELIEF

Application filed January 9, 1928, Serial No. 245,557, and in France March 9, 1927.

In all photographic reproducing objectives actually used the image of the diaphragm given by the objective itself is virtual and materially inaccessible.

The optical system which forms the subject of the present invention consists of a photographic objective particularly combined so that the image of the diaphragm is real and clearly distinct from the diaphragm itself which makes possible certain applications which could hitherto not be obtained.

In the accompanying drawing there are illustrated diagrammatically and solely by way of example, methods of construction of the invention.

Fig. 1 diagrammatically shows in axial section a view of a copying device comprising two convergent optical systems between which is placed a dioptric collector system which is likewise convergent, Fig. 2 shows diagrammatically in axial section a view of an embodiment wherein the convergent optical systems are mounted side by side, the dioptric mirror in Fig. 1 being replaced by a concave mirror, Fig. 3 diagrammatically shows in axial section an embodiment similar to that shown in Fig. 2 as applied to color cinematography, the dioptric collector in Fig. 1 being replaced by a convergent lens whose posterior face is silvered, and Fig. 4 is a partial view corresponding to Fig. 3 and showing the impression of a honeycomb film disposed circular-arc-fashion.

As shown in Fig. 1, the reproduction objective is essentially constituted by three separate positive (converging) optical systems indicated in the figures respectively by the letters O, C and O', in the order in which they are met with in the direction of the propagation of the light, and disposed one relatively to the other so that the image of the diaphragm D of the first system O has in turn for its image across the intermediate system C, the anterior image of the diaphragm D' of the third system O'. The diaphragms D and D' of the extreme system are thus optically conjugated.

According to the case of application specified hereinafter, the system O, referred to as a collimator, is, by itself single, as illustrated in Figures 1 and 2, or is multiple (as in Figure 3) that is to say composed of a number of similar converging systems, placed side by side, with their optical axes all parallel to that of the intermediate system C, and disposed as near as possible to said axis.

The system C, referred to as collector should be of a diameter sufficient to collect all the useful light which emerges from O. It is, therefore, of advantage to place it in the vicinity of the conjugated plane of the negative to be reproduced (X) relatively to the previous system O, which frequently enables it to be formed by a simple lens of which the optical perfection need not be very high.

Finally the last system O' (objective proper), is a converging system of which the axis coincides with that of C. It produces, from the negative placed at (X) a final upright image (X').

In order to insure shifting of the two films in the same direction under conditions of absolute synchronism, for instance, by means of a single drive shaft, it is advisable, as shown in Fig. 2, to replace the dioptric collector by a catadioptric collector, such as a mirror. As shown in Fig. 2, the disposition consists of a convergent dioptric system O placed in front of the film (X) to be reproduced or copied, and another convergent dioptric system O' placed in front of the film X' to be impressed. A concave mirror M is located in the focus of the two dioptric systems. Near the two dioptric systems is mounted a simple or a composite lens L—L', the purpose of which will be explained hereinafter.

In Fig. 3 is shown a reproduction objective similar to that shown in Fig. 2. It will be noted that the mirror M of Fig. 2 has been replaced in the embodiment of Fig. 3 by a lens C having a silver coated posterior face. It will also be noted that three identical convergent dioptric systems D are provided, instead of the single convergent dioptric system D of Fig. 2. The three identical dioptric systems each transfer an image corresponding to one of the fundamental colors according to the method disclosed in United States application S. N. 236,330 of Georges Chretien, filed Nov. 28, 1927. The images transmitted by the three dioptric systems O, as well as by the lens L—L' and reflected by the silvered lens C are united after having again passed through the lens L—L' and the dioptric system O' upon the film (X'), which, in this instance, may be of the honeycomb type; each of the said images impinging upon the lenses constituting the honeycomb system of the film under an angle differing according to the color to which corresponds each one of the original images.

An exceptionally advantageous arrangement for practical applications is obtained by forming the system C of a concave mirror (M, Figure 2) or by a lens (C, Figure 3) which is preferable in view of preserving the silvering of the same diameter, silvered on its rear face and with curvatures calculated so as to impart to the catadioptric system the same optical power as that required of the mirror.

As it is placed in the vicinity of the intermediate image, there intervene from the point of view of aberrations, only the curvature of Petzval, P, which is introduced thereby. If $\phi$ designates the power which this system should have, $\phi_1$ the power of the simple lens (of glass having an index $n$) of which it is formed, there is obtained for determining $\phi_1$;

$$P = +\phi - 2\frac{n+1}{n}\phi_1$$

The curvatures $\rho$ and $\rho'$ of the two faces will then be obtained by the formulæ

$$\rho = \phi_1 + \frac{2-n}{2(n-1)}\phi$$

$$\rho' = \phi_1 - \frac{\phi}{2}$$

By the use of this mirror the sensitized surface adapted to receive the image is brought close to the negative to be reproduced. As the images are upright—the reverse of which occurs in ordinary processes—and if furthermore the enlargement is unitary, the object and the image are displaced in the same direction, at right angles to the plane of the figure, at the same speed. It is thus possible to drive the negative and the sensitized layer by the same movement by means of the same shaft, (as illustrated at A A' in Figure 2), that is to say without any relative play, which renders possible rapid printing, with a continuous movement, of cinematographic copies for example.

In the case of a collecting system C with reflection, it is advisable to interpose in the vicinity of the systems O and O' a simple or compound lens L L' (Figures 2 and 3) of which the focal length is equal to its distance from the mirror for the purpose of disposing parallelly one to another the axes of O and O'.

The optical device described and which constitutes a characteristic feature of the invention, may have numerous applications which also, are expressly covered by the invention.

Two of these applications will now be indicated, only by way of example.

I. The device described is particularly well adapted for printing positive copies of cinematographic films.

By its use there are eliminated the serious disadvantages of printing by contact, which disadvantages are:

(1) The lack of sharpness of the printed image caused by the diffusion of the light by the grains of silver of the negative in contact with the sensitized layer.

(2) The intolerable exaggeration of this phenomena by the least accidental coming out of contact of the two layers, which should be strongly pressed one against the other, from which results:

(3) A rapid alteration or impairment of the original by its repeated friction against the successive copies, with the interposition of dust, etc.

(4) The rapid alteration or impairment also of the driving perforations of the original, by reason of the jerky movement of the film.

(5) The slowness of printing by reason of the necessity of bringing to rest the surfaces in contact.

II. The complete independence of the two diaphragms D and D' produces a practical solution of the problem of composite photographs with single restoration, for example, that of monochrome synthesis obtained for the purpose of color photography in one single negative with optical chromo-type elements, or the synthesis of two stereoscopic negatives which should be observed by the process of anaglyphs.

For this application, it is necessary, in accordance with the invention:

(a) To use as a collimator system O a multiple objective disposed as hereinbefore explained and formed of as many elementary objectives as there are negatives or positives to be combined into a single one, two in the case of stereoscopy, three in the case of trichromy, etc. The opening of the diaphragm of the system O' should then be sufficient to contain the images of all the elementary diaphragms placed at D.

(b) To use, for registering the combined images at (X') a film of which the non-sensitized side—which is turned towards the front—has a goffering of cylindrical lenses parallel to one another and of which the principal focus for the luminous rays which are refracted in the cross section, fall within the thickness of the sensitized layer. The equidistance $c$ to be given to the goffered cylindrical lenses on the film is determined by the condition for reducing to a minimum the surface which is not used between the consecutive photographic regions. If:

$n$ indicates the index of refraction of the support, $e$ its thickness, $\Omega$ the relative opening of the objective $O'$, it is necessary to make $$c = \Omega e/n$$

and consequently the number of lenses per unit of length will be:

$$N_1 = n/\Omega e.$$

For example, when $n=1.5$; $e=0.15$ mm. and $\Omega = 1/3$, it will be found that:

$$N_1 = 30 \text{ lines per millimeter.}$$

Instead of arranging the film along the plane $(X')$, there is an advantage to dispose it along a circular cylinder of which the axis is parallel to the generating lines of the lenses. This arrangement would obviate an inconvenience which results from the obliquity of the rays issuing from the convergent dioptric systems $(D')$ upon the honeycomb film, and which is due to the fact that, in a case where the film is planar or smooth, for each of the elementary lenses of the said honeycombed film the minute image is no longer formed in the neighborhood of the center of the space covered by the said elementary lenses in so far as the rays coming from the peripheral portions of the systems $(D')$ are concerned, but rather at a more or less great distance from the said center; and this distance may be large enough to exceed or overflow the minute image upon a part (of the sensitized coat) which would not be covered by the elementary lenses, the latter not being strictly contiguous. For color cinematography, this condition would result in the inconvenience that the portions thus impressed outside the field or area covered by the elementary lenses will no longer correspond to the original monochrome whence the corresponding rays originate, and the result is inferior pictures upon projection.

In Fig. 4 there is shown a dioptric system $(D')$ mounted in front of a honeycomb film disposed along a cylindrical surface, in other words presenting in cross section the form of a circular arc. In this case the inconvenience associated with obliquity of the rays $(D'R)$ and $(D'B)$ is minimized as much as possible. The radius $r'$ of the cylindrical surface is calculated by the formula:

$$\frac{1}{r'} = \frac{1}{p} - \frac{1}{p_1}$$

where $p$ indicates the distance of the pupil of emergence of the system $O'$ to the focus $(X')$ and $p_1$ the corresponding distance for the objective which serves finally for projection.

The film being thus obtained for the purpose of projection with an objective having a pupilary distance $p_1$, then if it is desired to project it with an objective having a pupilary distance $p_2$ it will suffice to interpose into the lamp, very close to the film, and towards the objective end, a lens having a focal length $f$, such that:

$$\frac{1}{f} = \frac{1}{p_2} - \frac{1}{p_1} = \frac{1}{p_2} - \frac{1}{p} + \frac{1}{r}$$

What I claim is:

1. In a photographic optical system of the character set forth the combination of two separate and distinct convergent optical means with diaphragms, with an optically intermediate convergent optical device adapted to form the image transmitted by said optical means, said optical means and their diaphragms being optically conjugated.

2. In an optical system of the character set forth the combination of two separate and distinct objectives and their diaphragms, with an optically intermediate convergent optical means adapted to form the images of the diaphragms, said objectives and their diaphragms being optically conjugated.

3. In an optical system of the character set forth the combination of two separate and distinct objectives and their diaphragms, with an optically intermediate convergent optical means adapted to receive the image of the diaphragms, said diaphragms occupying such relative positions and being of such dimensions as to be optically conjugated.

4. In an optical system of the character set forth in claim 1 wherein one of the convergent optical means includes an ordinary objective.

5. In an optical system of the character set forth in claim 1 wherein one of the two convergent optical means includes a plurality of ordinary objectives.

6. In an optical system of the character set forth in claim 1 wherein one of the convergent optical means includes an ordinary objective, the latter being optically conjugated with reference to the diaphragm of the other convergent means through the intermediate convergent optical device.

7. In an optical system of the character set forth in claim 1 wherein the intermediate optical device has an effective diameter at least equal to the image projected thereon.

8. In an optical system of the character set forth in claim 1 wherein the two convergent optical means are mounted side by side and the intermediate convergent optical device has a mirrored surface and has an effective diameter at least equal to the diameter of the image projected thereupon.

9. In an optical system of the character set forth in claim 1 wherein the convergent optical device consists of a lens silver-coated upon its rear face and having a diameter at least equal to the image projected thereon.

10. An apparatus for photographically reproducing cinematographic films including two separate and distinct objectives located side by side and having diaphragms, an optically intermediate convergent optical means adapted to form the image of the diaphragms and a pair of reels on the same identical drive shaft and disposed in front of the objectives, said reels carrying the film to be reproduced and the sensitized film respectively.

In testimony whereof I have signed my name to this specification.

HENRI CHRÉTIEN.